Jan. 31, 1956 J. C. LEARY 2,732,790
WIRE TIE FOR BALERS
Filed Nov. 3, 1950 6 Sheets-Sheet 2

INVENTOR.
JOSEPH C. LEARY,
BY: Harold B. Hood.
ATTORNEY.

Fig. 7.

United States Patent Office 2,732,790
Patented Jan. 31, 1956

2,732,790
WIRE TIE FOR BALERS

Joseph C. Leary, Greenfield, Ind.

Application November 3, 1950, Serial No. 193,875

13 Claims. (Cl. 100—4)

The present invention relates to a wire tier for baling machines or the like. The primary object of the invention is to provide an improved mechanism for effectively joining together the ends of wire strands surrounding bales of material, as each bale is completed. The invention is particularly adapted to use in connection with transit baling machines which, as they move automotively through a field, will pick up hay, straw, or any similar material, deliver that material to a baling chamber, compress the material into bales of suitable size, while encompassing each bale with one or more wire strands, form a joint in each wire strand to retain the baled material, and then dispose a new section of wire in such relation to the baling chamber as to encompass the next bale to be formed, finally discharging the formed and bound bale from the machine.

A major object of the invention is to provide a mechanism of the character above indicated in which each joint is formed by twisting together opposite ends of a bale-encompassing strand with the termini of the twisted wire portions pointing in opposite directions. Several devices heretofore known are so constructed as to twist together terminal portions of a wire strand with the extremities thereof pointing in a common direction; but such twists subject the wire to a cutting stress so that, when sudden shocks are impressed upon the bale as, for instance, when a bale falls from a vehicle or from a stack, or when a bale is located near the bottom of a high stack of bales, the binding wire will break or be cut at the point of jointure. An entirely different kind of holding action is produced when the wire ends are twisted together with their termini pointing in opposite directions. Such a twist is comparable to a threaded connection, in which separating or breaking forces are divided more or less equally among the several turns in which the wire ends are joined together; and as a consequence, it has been found that such a joint will remain undisturbed even by forces applied to or through the bale of such magnitude as to break the wire elsewhere in its length.

A further object of the invention is to provide a novel means for carrying the trailing end of a bale-encompassing wire strand across the baling chamber into cooperative association with an anchored end of such strand, and for laying the wire portion so carried into a twisting mechanism in the optimum relation to the anchored end of the wire. A further object of the invention is to provide a needle for so carrying the strand end, the needle being so constructed as to engage the wire at two spaced points, and being so operated as to reverse the relative positions of those two points before laying the wire section engaged between the points into the twisting mechanism.

A still further object of the invention is to provide novel means, actuated by reciprocation of the baling plunger, for operating the needle, and other novel means, likewise operated by reciprocation of the baling plunger, for operating the wire-twisting mechanism. Still another object of the invention is to provide novel twisting mechanism. A still further object of the invention is to provide means, dominating the action of the needle and of the twisting mechanism, such means in turn being actuated by progress of the material being baled through the baling chamber.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figures 1, 19:
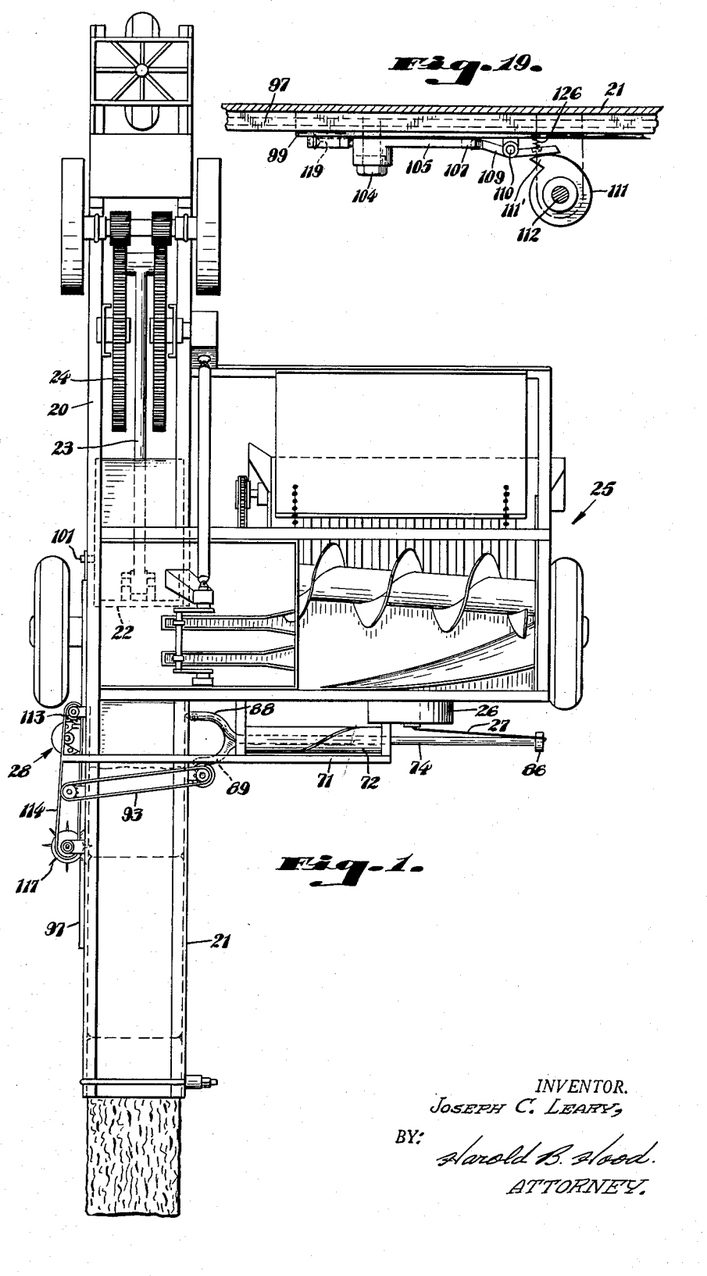
Fig. 1 is a plan view, more or less diagrammatic, of an otherwise conventional transit baling machine embodying my novel wire-tying mechanism.
Fig. 19 is a fragmental plan view of the latch device for the needle-actuating mechanism illustrated in Fig. 6.

Referring more particularly to the drawings, I have shown, in Fig. 1, a conventional baler comprising a frame 20 mounted on suitable ground wheels and driven automotively, though such a machine may, if desired, be drawn behind a tractor. The machine is provided with a conventional baling chamber 21 projecting rearwardly in the line of travel of a reciprocable plunger 22 which is conventionally driven by a pitman 23 from a suitably driven flywheel 24. The means for reciprocating the plunger 22 forms no part of my present invention, and may take any desired form. Gathering and feeding mechanism, indicated generally at 25, may likewise take any desired form; or the material to be baled may, if desired, be manually fed to the baling chamber.

At some point, there will be carried on the frame 20 one or more sources of supply of wire, indicated at 26 in the present drawings. In the illustrated embodiment of the invention, two such sources will be provided, one carried above the other, and a continuous strand 27 of wire will be fed from each source to its associated needle, there being handled in the manner later to be described. The sources of wire supply will preferably be carried at one side of the baling chamber 21; and wire-joining mechanism will be carried at the opposite side of said chamber. In the illustrated embodiment of the invention, the wire-joining mechanism, indicated generally at 28, is mounted adjacent a vertical wall of the baling chamber for rotation about a vertical axis; but this specific arrangement is not essential so long as the wire-joining mechanism is mounted adjacent one wall of the baling chamber and the wire source for each needle is carried adjacent the opposite wall thereof.

In the illustrated embodiment of the invention, the wire-joining mechanism 28 is carried between a pair of frame elements 29 and 30 (Fig. 7) projecting horizontally outward from a vertical wall of the baling chamber 21. As shown, the mechanism 28 comprises two twister heads 31 and 32, one for handling each of the two wire strands which will surround each bale formed in the machine. Since the twister heads 31 and 32 are identical, but allo-chirally mounted, only one has been illustrated, and will be described, in detail.

At the forward end of each frame member there is provided a spring finger 33 which may be integral with, or suitably attached to, its frame member, for a purpose which will appear hereinafter. Supported closely adjacent each frame member, and underlying the spring finger 33, is an end plate 34 comprising a portion of a housing embodied in such twister head. Each frame member also comprises a bearing projection 35 in which is journalled a stud 36 projecting axially from the plate 34. A second end plate 37 closes the opposite end of the housing and is provided with an enlargement 38 in which is received a shaft 39, fixed in place by means of a pin, set screw, or similar fastening element 40.

Within the housing, a partition 41 is formed to support a rotor 42 (Figs. 8 and 9), said rotor being formed with oppositely-projecting hubs 43, 43 received in bearing pockets in opposite walls of the partition 41. A similar rotor 44 is mounted, upon a parallel axis, adjacent the opposite end of the partition 41, said partition being formed with suitable sockets providing a journal mounting for the oppositely-projecting hubs 45, 45 of said rotor 44. As is clearly shown in Fig. 9, each rotor 42 and 44 is provided with a peripheral series of teeth; and a gear 46, fixed to a shaft 47 journalled in the partition 41, meshes with both of said rotors 42 and 44. The shaft 47 carries a beveled gear 48 (Figs. 7 and 8) meshing with a beveled gear 49 having a stem journalled in the plate 37 and carrying, outside the housing, a gear 51 meshing with a pinion 52 loosely sleeved on the shaft 39.

The housing is formed with a mouth or slot 53 (Fig. 9) which, with the parts in their illustrated positions, directly faces, and opens toward, the adjacent wall of the baling chamber 21; and the rotor 42 is formed with a slot 54 extending from the axis of said rotor and opening through the periphery thereof. In the illustrated positions of the elements, the rotor slot 54 precisely registers with the housing slot 53. A similar slot or mouth 55 is formed in the housing, opening, in the illustrated positions of the elements, directly away from the baling chamber wall 21; and the rotor 44 is formed with a slot 56 similar to the slot 54 and registering, at times, with the housing mouth 55. The rotors 42 and 44 being of equal pitch diameter, it will be obvious that the slot 56 will register with the slot 55 whenever the slot 54 registers with the slot 53.

Figure 7:
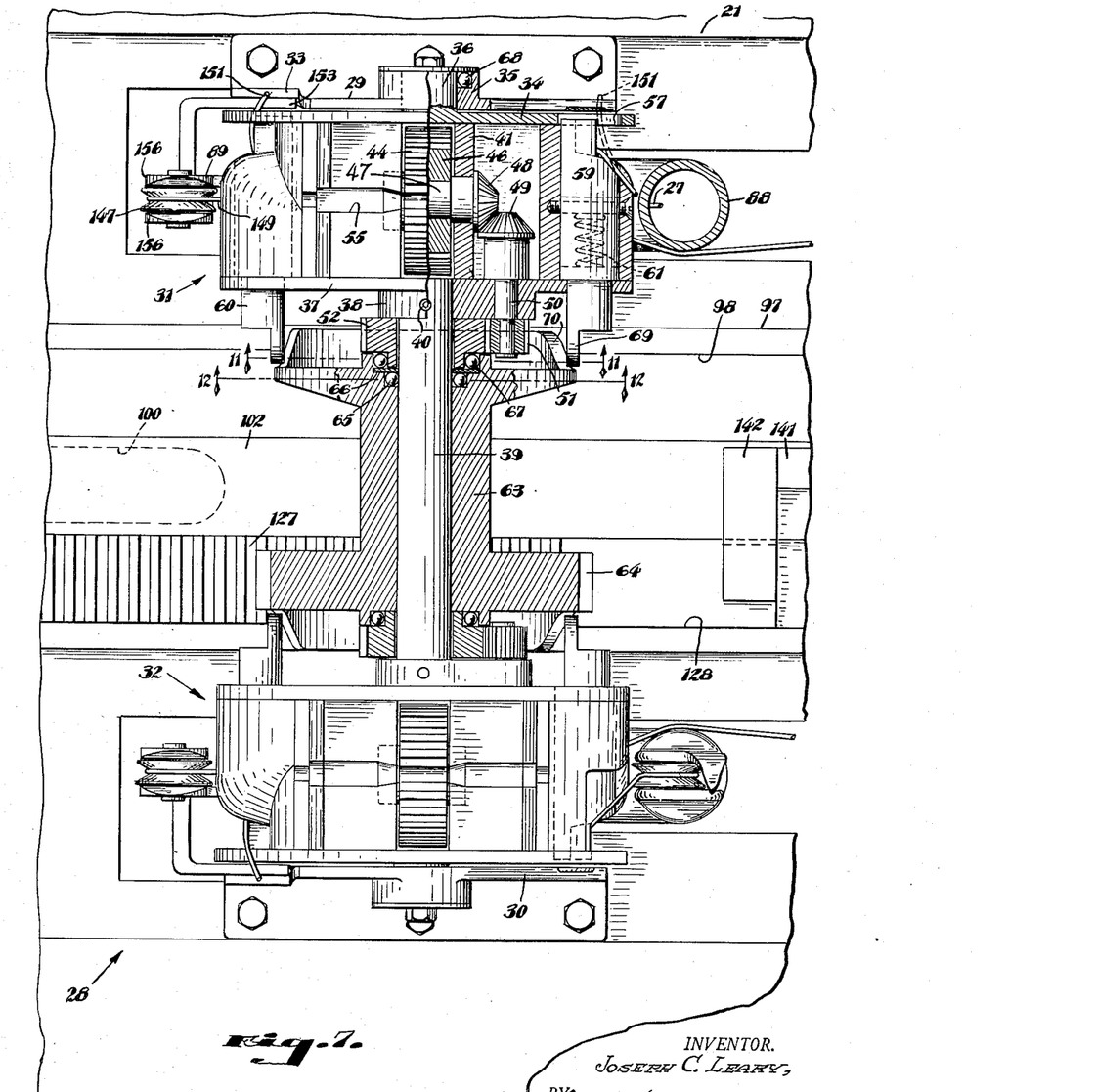
Fig. 7 is a fragmental vertical sectional view of the twister mechanism of the present invention, parts being shown in elevation, drawn to a still further enlarged scale.
Figures 8, 9, 10, 11, 12:
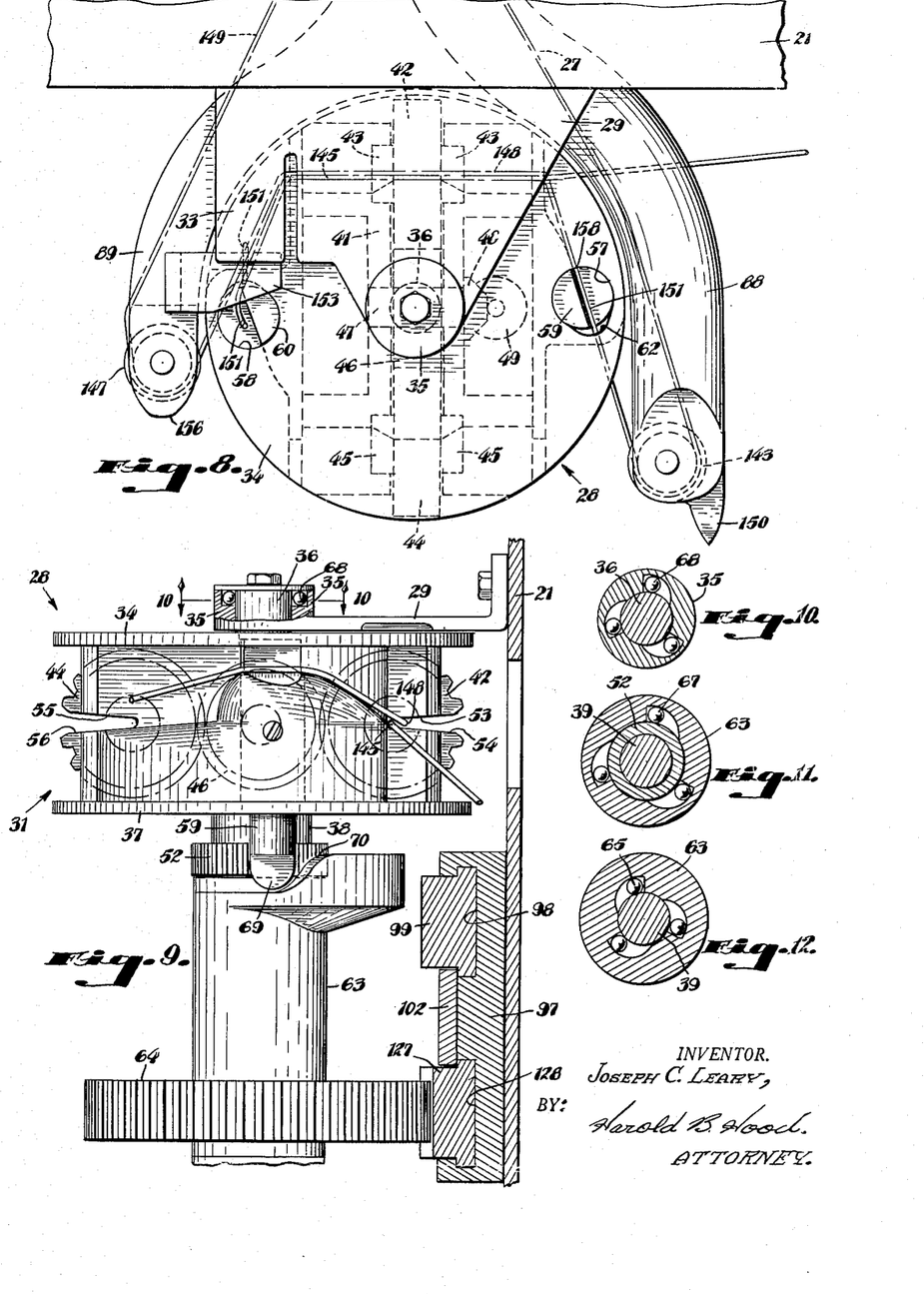
Fig. 8 is a plan view of the twister mechanism shown in Fig. 7.
Fig. 9 is an elevation, partly in section, taken from the right-hand side of Fig. 7.
Fig. 10 is a horizontal section taken on the line 10—10 of Fig. 9.
Fig. 11 is a similar section taken on the line 11—11 of Fig. 7.
Fig. 12 is a similar section taken on the line 12—12 of Fig. 7.

At diametrically spaced points, the plate 34 is formed with die openings 57 and 58; and shear plungers 59 and 60, mounted for reciprocation in the housing upon axes parallel with the axis of the shaft 39, register with said openings 57 and 58, respectively. Normally, said plungers are held in retracted positions, as illustrated in Figs. 7, 8 and 9, by springs 61 or other suitable means. It will be noted (Fig. 8) that, whereas the plungers 59 and 60 are cylindrical, each die opening is formed with an enlargement 62. Thus, when the plunger 59 or 60 is elevated to move through its associated die opening, its periphery closely mates with the major portion of the periphery of the die opening, but clears the enlarged region 62 by a dimension substantially equal to the diameter of the wire strand 27, for a reason which will become apparent as the description proceeds.

Loosely sleeved on the stem 39 is a drive element 63, near one end of which is formed a pinion 64. A one-way clutch 65 is interposed between the shaft 39 and the drive element 63. As shown (Figs. 7 and 12), the clutch 65, which is of conventional construction, is active to provide a drive connection between the element 63 and the shaft 39 upon rotation of the element 63 in a clockwise direction, as seen in Fig. 12. A washer 66 intervenes between the clutch 65 and an oppositely active one-way clutch 67 interposed between the drive element 63 and the gear 52. The clutch 67 (Figs. 7 and 11), is active to provide a drive connection between the element 63 and the gear 52 upon counter-clockwise rotation of the element 63, as viewed in Fig. 11. A one-way brake 68, of conventional construction (Figs. 7 and 10) is interposed between the stud 36 and the enlargement 35 on the plate 29, said brake being effective to prevent counter-clockwise rotation of the stud 36 (and the housing 31 and shaft 39) as viewed in Fig. 10.

Each of the plungers 59 and 60 is provided with a depending finger 69 with which cooperates, at times, a cam projection 70 on the drive element 63, the relation being such that, as the element 63 turns in a counter-clockwise direction, as viewed from the plane of the line 11, 11 in Fig. 7, the plungers will be projected through their cooperating die openings, for a purpose which will appear hereinafter.

Figures 2, 3, 4:
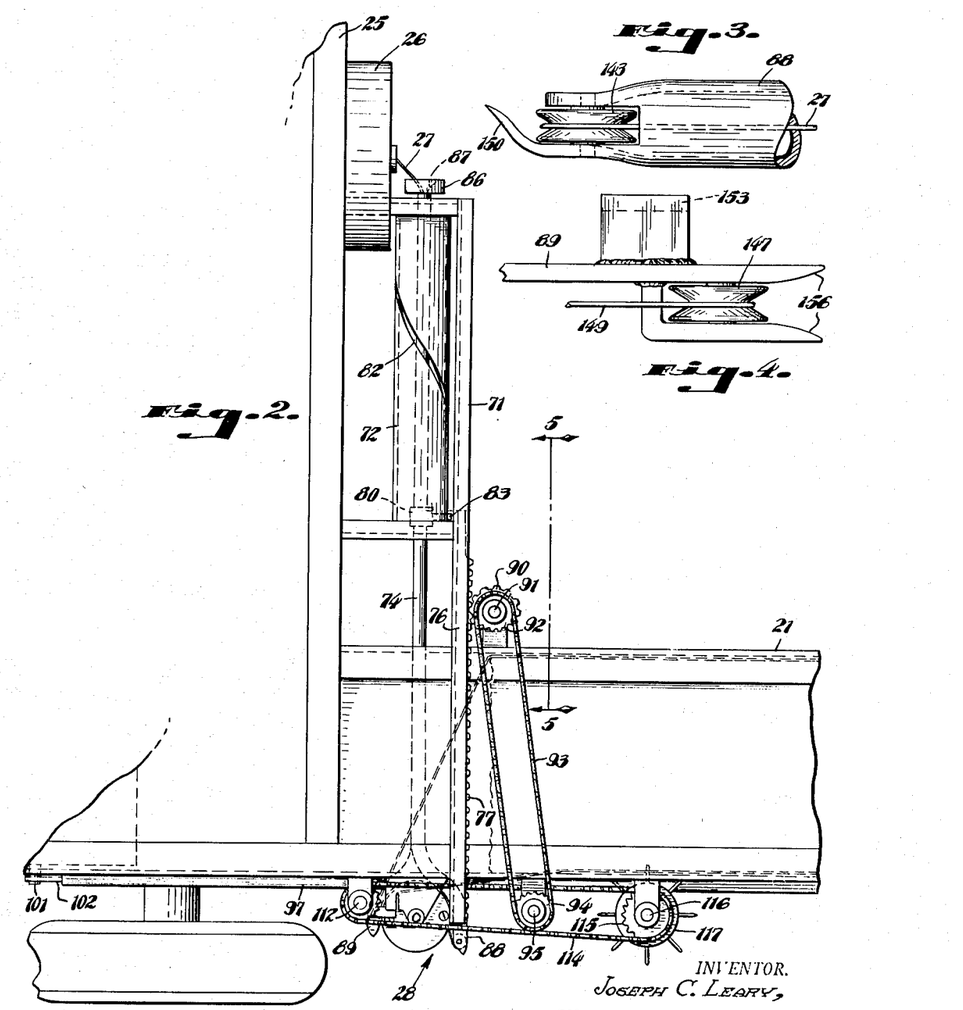
Fig. 2 is a fragmental plan, drawn to an enlarged scale, of a needle, needle-actuating mechanism, twister mechanism, and timer constructed in accordance with my present invention.
Fig. 3 is a still further enlarged fragmental elevation of one furcation of a needle embodied in my invention, viewed from the right-hand side of Fig. 2.
Fig. 4 is a similar view of the other furcation viewed from the left-hand side of Fig. 2.
Figures 5, 6:
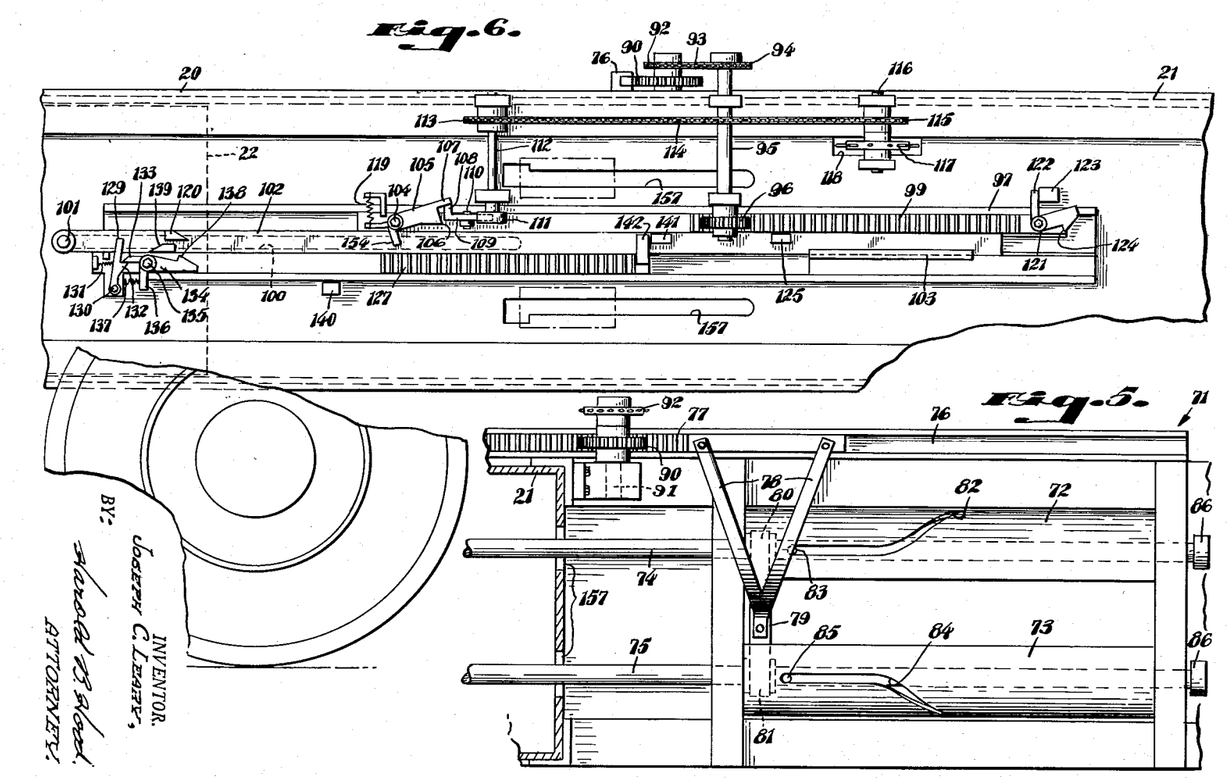
Fig. 5 is a rear elevation, partly in section, taken on the line 5—5 of Fig. 2.
Fig. 6 is a side elevation, drawn to a similar scale, and looking from the bottom of Fig. 2, the twister mechanism being removed for clarity of illustration.

Suitably carried on the machine and, in the illustrated embodiment of the invention, on the rear wall of the feeding mechanism 25, there is mounted a frame 71 (Figs. 2 and 5). The frame 71 carries, for each chamber-traversing needle, a guideway to be described. In the illustrated embodiment of the invention, there are provided two such guideways 72 and 73, parallel with each other, and perpendicular to the length of the baling chamber, and open at their adjacent, longitudinally-extending sides. A needle 74 is reciprocably guided in the guideway 72 and a similar needle 75 is similarly guided in the guideway 73. Suitably formed on or carried by the frame 71 is a slideway 76 in which is reciprocally guided a rack 77. Arms 78, fixed to the rack 77, are rigidly connected to a stretcher 79 carrying, at its opposite ends, collars or yokes 80 and 81 respectively operatively engaging the needles 74 and 75. The arrangement is such that the needles 74 and 75 are immovable axially relative to the collars 80 and 81, but may rotate upon their respective axes relative to said collars. The guideway 72 is formed with a spiroidal slot 82 having a peripheral extent of 180°, and the needle 74 carries a pin 83 engaging in said slot. The guideway 73 is formed with a similar slot 84, of opposite hand, and the needle 75 carries a pin 85 engaging in the slot 84. It will be apparent, upon inspection of Figs. 2 and 5, that each needle will be turned through 180° about its own axis as it progresses from the position of Fig. 2 to the position of Fig. 1, or vice versa.

A collar 86, carried at the rear end of each needle, is formed to provide a flared mouth 87 (Fig. 2) for guiding the wire 27 as it flows from the source 26 to enter, and pass through, the needle 74 to the forward end of said needle.

At its forward end, the needle is provided with separated furcations 88 and 89, and the wire emerges through the furcation 88, as is clearly to be seen in Figs. 2, 3, 8, and 13 to 18 inclusive. The free ends of the furcations 88 and 89 are, in the normal position of the needle, spaced apart a substantial distance in the direction of reciprocation of the plunger 22, the furcation 88 being nearer the retracted position of the plunger than is the furcation 89. The special construction of the free ends of these furcations, lying substantially in a common horizontal plane, will be described in further detail hereinafter.

A pinion 90 is carried upon a shaft 91 in mesh with the rack 77, the shaft 91 being mounted for rotation about a vertical axis in suitable brackets adjacent that wall of the baling chamber 21 near which the frame 71 is carried. Said shaft carries also a sprocket 92 (Figs. 2, 5 and 6) which is drivingly connected by a chain 93 with a sprocket 94 upon a shaft 95 mounted for rotation about a vertical axis in suitable brackets carried by the opposite wall of the baling chamber 21. Said shaft 95 carries, also, a pinion 96.

A slideway 97 is carried on the last-mentioned wall of the baling chamber, extending longitudinally thereof, as is most clearly shown in Fig. 6. Said slideway is formed with a longitudinally-extending trackway 98 (Fig. 9) in which is slidably mounted a rack 99 meshing with the pinion 96.

An elongated slot 100, parallel with the trackway 98, is formed in the said baling chamber wall, and a pin 101, fixed to the plunger 22, projects through said slot for travel therein. Operatively connected to the pin 101 is a slide bar 102 suitably supported against vertical movement by engagement between racks 99 and 127 (Fig. 9), and preferably further guided by an upturned lip 103 (Fig. 6).

A pin 104, carried on the rack bar 99, pivotally mounts a latch 105 having a catch dog 106 normally held in the position in which it is illustrated in Fig. 6, by engagement of a finger 107 upon a lift block 108 at one end of a lever 109. Said lever 109 is mounted for oscillation upon a vertically arranged pivot 110, (Figs. 6 and 19), and is dominated by a cam 111 carried on a shaft 112. Said shaft 112 carries a sprocket 113 driven, through a chain 114, from a sprocket 115 on a shaft 116 which carries also a spur wheel 117 projecting, through an opening 118 in the wall of the baler chamber 21, into coactive engagement with baled material being moved progressively through the baling chamber. The rate of angular movement of the wheel 117 in response to movement of the baled material will be selectively determined, of course, by selection of a wheel of any suitable diameter. The arrangement is such that, when a desired volume of material has moved past the opening 118, the tip of the cam finger 111' (Fig. 19) will act upon the lever 109 to withdraw the lift block 108 from beneath the finger 107, permitting the spring 119 to swing the latch 105 in a clockwise direction from the position in which it is illustrated in Fig. 6. A spring 126 opposes movement of the lever 109 by the cam 111, and, once the cam finger has left the lever 109, said spring resiliently holds the block 108 against the adjacent side of the finger 107, urging said block to return to its illustrated position.

An abutment element 120 (Fig. 6) is carried by the slide 102; and when the latch 105 drops after displacement of the lever 109, its dog 106 is disposed in the path of the abutment 120. The lever 109 will be moved from beneath the finger 107 after the abutment 120 has passed the position of the latch, moving toward the right as viewed in Fig. 6. As said abutment returns toward the left, however, it will engage the dog 106 to carry the rack 99 toward the left during the further retractile movement of the plunger 22.

Movement of the rack 99 toward the left will, of course, rotate the shaft 95 in a direction to project the needles 74 and 75 from the positions illustrated in Fig. 1 toward the position illustrated in Figs. 2 and 8, each needle turning through 180° about its own axis during such projection.

A second latch 121 is pivotally mounted upon the opposite end of the rack bar 99, said latch being provided with a finger 122 which, in the illustrated positions of the parts, is engaged by a fixed stop 123 to hold its dog 124 in retracted position out of the path of an abutment 125 carried on the slide bar 102. As the rack 99 moves toward the left, however, the finger 122 is withdrawn from the block 123 and the latch 121 swings in a clockwise direction to place its dog 124 in the path of said abutment 125.

A second rack bar 127 is mounted in a trackway 128 (Fig. 9) in the slideway 97. A lever 129 is pivotally mounted upon a pin 130 supported to move with said rack bar 127; and said lever projects into the path of a finger 154 of the latch 105. As the plunger 22 attains its limit of retractile movement, carrying with it the latch 105 and the rack bar 99, the finger 154 strikes the lever 129 to shift the same in a counter-clockwise direction against the tendency of a spring 131. Thus, a dog 132 on the lever 129 is removed from supporting relation with a finger 133 of a latch 134 pivotally mounted on a pin 135 which moves with the rack bar 127. Said latch 134 is provided with an arm 136 against which bears a spring 137 which, when the dog 132 is so withdrawn, swings the latch 134 in a counter-clockwise direction to shift its dog 138 into the path of an abutment 139 carried on the slide bar 102. When the abutment 139 engages the dog 138, of course, the rack bar 127 will be moved toward the right upon advancing movement of the plunger 22, to rotate the pinion 64 (Figs. 7 and 9) which meshes with the rack 127.

The springs 131 and 119 are so calibrated that engagement of the finger 154 with the lever 129 not only shifts the lever, but also swings the latch 105 in a counterclockwise direction to permit the block 108 on the lever 109 to engage beneath the finger 107, thus withdrawing the dog 106 from coaction with the abutment 120.

During advancing movement of the plunger 22, the abutment 125 will engage the dog 124 on the latch 121 to return the rack 99 to its illustrated position.

After a predetermined degree of movement of the rack bar 127 toward the right, with advancing movement of the plunger 22, such as to produce 180° of rotation of the pinion 64, the latch finger 136 will strike an abutment 140, fixed with respect to the slideway 97, to disengage the dog 138 from the abutment 139, thus arresting movement of the rack bar 127.

Upon return movement of the plunger 22 and slide bar 102, an abutment 141 on said slide bar will engage an abutment 142 fixed to the rack bar 127, to return said rack bar to its illustrated position, thereby imparting 180° of rotation, in the opposite direction, to the pinion 64. Of course, as soon as the latch 134 is shifted by engagement with the abutment 140, the dog 137 again engages under the finger 133.

*Operation*

Figure 13:
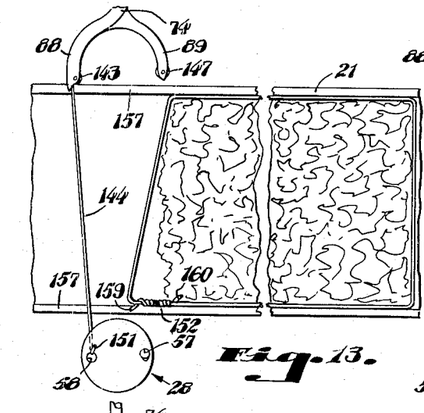
Figs. 13 through 18 inclusive are more or less diagrammatic views illustrating successive steps in the operation of the illustrated embodiment of my invention.

In Figs. 13 to 18, the step-by-step operation of the mechanism of the present invention is more or less diagrammatically illustrated. Fig. 13 shows the parts in the positions which they occupy immediately after the completion of one bale and the retraction of the needle 74, and before the next projection of the plunger 22. The wire strand 27, which is threaded through the needle 74 and through the furcation 88 thereof, passes across a roller 143 carried at the extremity of said furcation, traverses the baling chamber, passing through slots 157 formed in the opposite walls of said chamber, and is anchored on the twister mechanism 28. As is clearly to be seen in Fig. 13, the section 144 of the strand extends beneath the plate 34 and has a tail or kink 151 projected upwardly, and turned back toward the baling chamber, through the die opening 58.

As the plunger continues to reciprocate, successive wads of material being baled will be forced rearwardly (toward the right) to carry the strand section 144 toward the right, drawing additional wire from the source 26 through the needle 74 and around the roller 143. This movement of the wire in the baling chamber will lay a section 145 of the wire in the mouth 53 of the twister unit 31 and in the registering slot 54 of the rotor 42, in the manner clearly illustrated in Fig. 14.

Successive deliveries of wads of material by the plunger 22 will, of course, cause the previously formed bale to move, step by step, toward the right through the baling chamber, thus rotating the measuring spike wheel 117. Through the shaft 116, sprocket 115, chain 114, sprocket 113 and shaft 112, the cam 111 (Figs. 6 and 19) is thus rotated in a clockwise direction. As its tip 111' reaches the end of the lever 109, the lifter block 108 will be displaced from beneath the finger 107 of the latch 105, permitting the spring 119 to swing said latch to locate its dog 106 in the path of the abutment 120. This will occur, usually, just before the end of the advancing stroke of the plunger; and as the plunger completes that stroke, the cam tip 111' leaves the lever 109, so that the spring 126 may press the block 108 against the lower side (as viewed in Fig. 19) of the latch finger 107.

As the plunger returns, the abutment 120 will strike the dog 106 to carry the rack bar 99 toward the left, as viewed in Fig. 6, during the remainder of the retractile stroke of the plunger. As the rack bar so travels, it will cause counter-clockwise rotation of the pinion 96, as viewed from above in Fig. 6.

Figure 14:
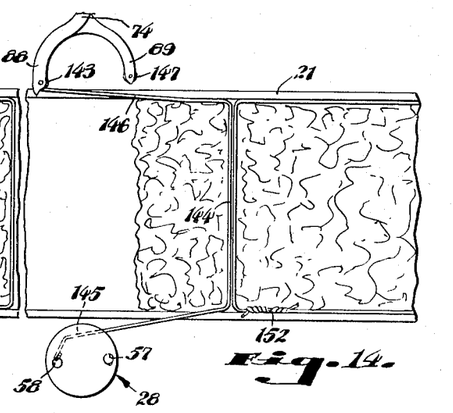
Figure 15:
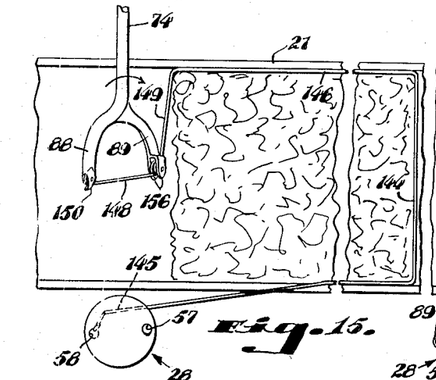

Through the shaft 95, sprocket 94, chain 93 and sprocket 92, the shaft 91 and its pinion 90 will thus be driven in a counterclockwise direction as viewed in Fig. 2 to drive the rack 77 downwardly as viewed in Fig. 2 from the position of Fig. 1 to the position of Fig. 2. Fig. 15 shows the needle in an intermediate position as it travels toward the position of Fig. 2. Referring to Fig. 14, it will be seen that a reach of wire 146 extends from the forward end of the bale being formed along the wall of the baling chamber adjacent the normal position of the needle to the roller 143 carried on the needle furcation 88. The needle furcation 89 carries a roller 147 disposed in the plane of the roller 143; and, as the needle starts downward, the roller 147 will engage said reach 146 of the wire strand at a point closely adjacent the end of the compressed material nearer the plunger. A section 148 of the wire strand is thus defined between the rollers 143 and 147.

Figures 16, 18:
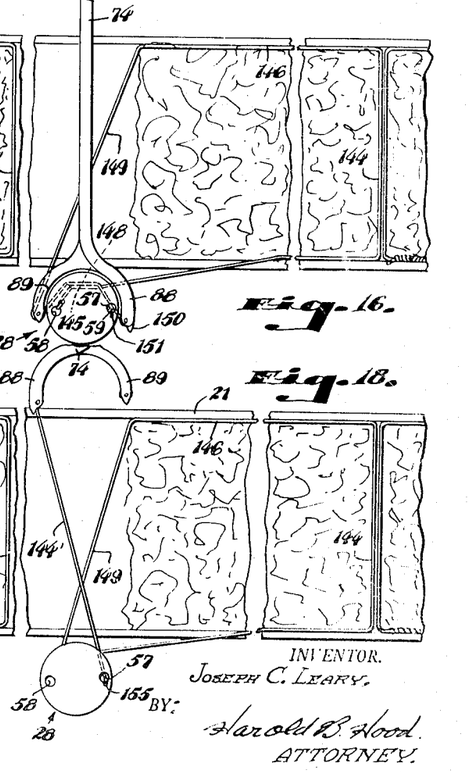
Figure 17:
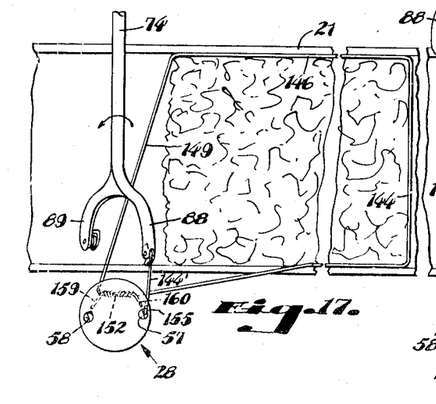

As the needle moves downwardly, as seen in these figures, a reach 149 is carried across that end of the baled material nearer the plunger; and, through the coaction of the pin 83 with the spiraloid slot 82 (Fig. 5), the needle is caused to turn, in a clockwise direction as viewed from below in Fig. 15, through 180° about its own axis. Thus, as the needle furcations 88 and 89 approach the twister mechanism 28, their positions have been reversed, the furcation 88 now being disposed inside the loop defined by the strand sections 145, 144, 146 and 149. In this position, the strand section 148 is projected, by the needle furcations 88 and 89, into the mouth 53 of the twister mechanism and the slot 54 of the rotor 42, where the section 148 will lie in parallelism and in contact with the section 145 previously laid in said mouth and slot, substantially at the axis of rotation of the rotor 42. This condition of the parts is shown in Fig. 16.

As the plunger 22 reaches the limit of its retractile movement, the finger 154 strikes the lever 129 to release the latch 134 which is engaged by the abutment 139 as the plunger starts again forwardly.

Thus, the rack bar 127 will be driven toward the right, as viewed in Fig. 6, as the plunger 22 moves forwardly. Such movement of the rack bar will rotate the pinion 64 (Fig. 7) and driving element 63 in a counter-clockwise direction as viewed from the planes of Figs. 11 and 12. Through the clutch 67, gears 52 and 51, gears 49 and 48 and pinion 46, the rotor 42 will thus be turned. Preferably, this gear train will be so designed and proportioned that 180° of rotation of the pinion 64 will produce a plurality—for instance, four—of complete rotations of the rotor 42. The abutment 140 (Fig. 6) is so positioned as to retract the latch 134 after a degree of movement of the rack bar 127 precisely sufficient to produce 180° of rotation of the pinion 64.

Immediately after initiation of rotation of the rotor 42, the plunger 59 will be projected upwardly, by the cam 70, to cut the section 148 of the wire strand at a point between the mouth 53 and the roller 143 on the needle furcation 88. As is clearly to be seen in Figs. 8 and 9, that section of the wire, at one point, overlies the plunger 59 so that, as said plunger is projected through the opening 57, the wire will be cut at the point 158. Because of the enlargement 62 of the opening 57, a short portion 151 of the wire will be bent upwardly, as the plunger is elevated, to lie between the adjacent wall of the plunger and the boundary of the enlargement 62. Preferably, the enlargement will be of such proportions that the bent tail 151 of the wire will be frictionally held between the plunger and the wall of the enlargement for so long as the plunger is held in its elevated position.

Now, as the rotor 42 continues to rotate, the sections 145 and 148 of the wire lying in parallel contiguity, will be twisted together to form the twist or joint 152. As the wire sections are so twisted, the opposite end projections thereof will be drawn toward the twister mouth so that, when the twist has been completed, very short ends 159 and 160 will extend away from the twist.

During projection or advancing movement of the plunger, the abutment 125 will strike the dog 124 of the latch 121 to entrain the rack bar 99 with further advancing movement of the plunger. Such movement of said rack bar 99, of course, retracts the needles 74 and 75. Such retractile movement of the needles begins promptly after initiation of the twist; and, of course, each needle turns in a counterclockwise direction about its axis, in the manner suggested in Fig. 17, as it is withdrawn, drawing a new reach 144' across the baling chamber to act, in connection with the next bale to be formed, precisely in the manner in which the reach 144 acted in the above description. The extremity of the reach 144', of course, remains anchored on the twister mechanism at 57.

As the plunger again returns, the block 141 on the slide bar 102 (Fig. 6) strikes the abutment 142 on the rack bar 127 to return said rack bar to its illustrated position. As the rack bar so returns, it rotates the pinion 64 in a clockwise direction as viewed from the plane of Fig. 12 in Fig. 7. Such rotation of the pinion 64, acting through the clutch 65, will turn the shaft 39 and the twister units 31 and 32 through 180° in a counter-clockwise direction as viewed in Fig. 18, thereby reversing the positions of the anchorages 57 and 58. The length of the bent tail 151 is such that it projects through the opening 57 and above the plane of the frame plate 29 (Fig. 8). As the unit 28 rotates in a counter-clockwise direction as viewed in Fig. 8, that tail of wire will be wiped against the frame plate 29 to be bent down into substantial parallelism with the plate 34. The spacing between the plate 34 and the frame plate 29 is substantially equal to the diameter of the wire, so that the wire tail will be frictionally held and firmly anchored by engagement between said plates. After the rotation of the unit 28 through 180°, this tail will lie in the position indicated in dotted lines beneath the spring finger 33. Thus, a very firm anchorage for the wire end, which will hold solidly during formation of the next bale, is provided.

The needle furcation 89 carries a finger 153 which, as the needle approaches the position of Fig. 8, will enter the space between the spring finger 33 and the plate 34 to force the tail 151 downwardly, as viewed in Fig. 8, thereby removing said tail from its engagement between the plate 34 and the finger 33 and releasing it to be drawn inwardly toward the twister mouth during the operation of the twister.

Now, of course, the mouth 55 and the slot 56 face the adjacent baling chamber wall, while the mouth 53 and the slot 54 face away from said wall. On the next cycle of operation of the needle, the wire strands will be laid in the mouth 55, and rotation of the rotor 44 will effect the twisting joint between the wire ends.

The needle furcation 89 is preferably formed with guide fingers 156 which act to guide the wire reach 146 onto the roller 147.

The needle furcation 88 is formed with a cam finger 150, most clearly shown in Fig. 3, but indicated also in Figs. 13 to 18. As the needle approaches the position of Fig. 16, the groove in its roller 143 is substantially in the plane of that reach of the wire extending from the twister mouth to the remote end of the bale. The finger 150 guards the entrance to the roller 143 and engages the said reach of the wire to deflect it downwardly so that the needle furcation 88 may pass over that reach of the wire to attain the position of Fig. 16.

While I have illustrated in some detail a mechanical drive whereby the needles and the twisters are actuated by reciprocation of the baling plunger 22, it will be obvious that other means for actuating those elements, properly timed with the plunger, so that the needles will not interfere with the plunger, may be utilized without departing from the principles of the invention herein disclosed. Broadly stated, my invention resides in the provision of means whereby the two ends of a bale-encircling strand may be brought into parallel contiguity with their extremities pointing in opposite directions, without first removing one end from the carrying needle, so that the two wire ends may subsequently be twisted together to produce a joint of the character illustrated at 152.

I claim as my invention:

1. For use with a baler comprising a baling chamber and a plunger reciprocable therein, twister mechanism carried adjacent one wall of said chamber, a needle normally carried outside an opposite wall of said chamber, means associated with said twister mechanism for retaining an end of a wire strand with a portion disposed in said twister mechanism and having a bight disposed in said chamber, a source of supply of wire, means on said needle engaging said wire strand between said source and said bight, means for shifting said needle to traverse said chamber, said needle acting alone, upon such traversal, to lay a section of said strand in said twister mechanism with that end of said section nearer said source and the extremity of said strand portion extending oppositely from said twister mechanism, and means for operating said twister mechanism to twist together said portion and said section of said strand.

2. For use with a baler comprising a baling chamber and a plunger reciprocable therein, twister mechanism carried adjacent one wall of said chamber and comprising a frame and a rotor journalled in said frame, said rotor being provided with a slot extending from the axis thereof and opening through the periphery thereof, a needle normally carried outside an opposite wall of said chamber, means associated with said twister mechanism for holding an end of a wire strand at a point axially spaced from one face of said rotor, said strand having a portion disposed in said rotor slot and extending therefrom as a bight disposed in said chamber, a source of supply of wire, means on said needle engaging said wire strand at two spaced points between said source and said bight, means for shifting said needle to traverse said chamber, said needle acting alone, upon such traversal, to lay that section of said wire strand between said spaced points in said rotor slot with that point nearer said source axially spaced from said rotor in a direction opposite the spacing of said strand end, and means for rotating said rotor to twist together the strand portions disposed in said rotor slot.

3. The mechanism of claim 1 including means acting to sever said strand at a point between said section and said needle before operation of said twister mechanism, and means carried by said twister mechanism retainingly engaging said strand between the point of severance and said needle.

4. The mechanism of claim 2 including means carried by said twister mechanism retainingly engaging said strand adjacent said nearer point, and means, acting before rotation of said rotor, to sever said strand in the region between said rotor and said last-named strand-retaining means.

5. For use with a baler comprising a baling chamber and a plunger reciprocable therein, wire-end joining means carried adjacent one wall of said chamber, means associated with said joining means for anchoring an end of a wire strand, said strand having a portion operatively engaged in said joining means and extending therefrom to define a bight disposed in said chamber, a source of supply of wire, a needle normally carried adjacent a wall of said chamber opposite said first-named wall, said needle having a first point of engagement with said strand between said source and said bight and a second point of engagement with said strand between said first point and said bight, means for shifting said needle to traverse said chamber to enter that section of said strand between said points into operative engagement in said joining means, means for reversing the positions of said points relative to said bight during transit of said needle, and means for operating said joining means while said portion and said section are engaged therein.

6. For use with a baler comprising a baling chamber and a plunger reciprocable therein, wire-end joining means carried adjacent one wall of said chamber, means associated with said joining means for anchoring an end of a wire strand, said strand having a portion operatively engaged in said joining means and extending therefrom to define a bight disposed in said chamber, a source of supply of wire, a needle normally carried adjacent a wall of said chamber opposite said first-named wall, said needle having a first point of engagement with said strand between said source and said bight and a second point of engagement with said strand between said first point and said bight, means for shifting said needle to traverse said chamber to enter that section of said strand between said points into operative engagement in said joining means, means for reversing the positions of said points relative to said bight prior to entry of said strand section in said joining means, and means for operating said joining means while said portion and said section are engaged therein.

7. For use with a baler comprising a baling chamber and a plunger reciprocable therein, wire-end joining means carried adjacent one wall of said chamber, means associated with said joining means for anchoring an end of a wire strand, said strand having a portion operatively engaged in said joining means and extending therefrom to define a bight disposed in said chamber, a source of supply of wire, a needle normally carried adjacent a wall of said chamber opposite said first-named wall, said needle having a first point of engagement with said strand between said source and said bight and a second point of engagement with said strand between said first point and said bight, said first and second points being spaced apart in the direction of reciprocation of said plunger, means for shifting said needle to traverse said chamber to enter that section of said strand between said points into operative engagement in said joining means, means for reversing the positions of said points relative to said bight prior to entry of said strand section in said joining means, and means for operating said joining means while said portion and said section are engaged therein.

8. For use with a baler comprising a baling chamber and a plunger reciprocable therein, a wire-end joining mechanism carried adjacent one wall of said chamber and provided with a wire-end-receiving mouth, a first anchorage for an end of a wire strand, a second anchorage for an end of a wire strand, said anchorages being respectively located on said joining mechanism adjacent opposite ends of said mouth, a strand anchored on said first anchorage being adapted to extend through said mouth and thence into said baling chamber to define a bight traversing said chamber, a source of supply of wire, a needle normally carried adjacent a wall of said chamber opposite said first-named wall, said needle having a point of engagement with said strand between said source and said bight, means for shifting said needle to traverse said chamber to enter a portion of said strand between said source and said bight in said joining mechanism mouth and dispose a point on said strand between said portion and said needle point of engagement in registry with said second anchorage, means cooperable with said strand, at a point between said mouth and said last-named strand point, to sever said strand and engage said strand with said second anchorage, means for withdrawing said needle, means for driving said joining mechanism to join the portions of said strand disposed in said mouth, and means for shifting said joining mechanism to eject said joined strand portions from said mouth and to reverse the positions of said anchorages.

9. For use with a baler comprising a baling chamber, a plunger reciprocable therein, and means for driving said plunger, twister mechanism carried adjacent one wall of said chamber, a needle normally carried outside an opposite wall of said chamber, means associated with said twister mechanism for retaining an end of a wire strand with a portion operatively engaged in said twister mechanism and having a bight disposed in said chamber, a source of supply of wire, means on said needle engaging said wire strand between said source and said bight, means providing a driving connection between said plunger and said needle, at times, to project said needle across said chamber and into cooperative relation with said twister mechanism, upon retractile movement of said plunger away from said chamber, to enter a section of said strand in said twister mechanism, latch means included in said driving connection, means normally holding said latch means disengaged to prevent actuation of said needle by said plunger, measuring means driven by movement of material through said chamber for actuating said holding means to release said latch, means positioned in the path of said latch adjacent the limit of retractile movement of said plunger for disengaging said latch to reset said holding means, other abutment means included in said driving connection for retracting said needle upon advancing movement of said plunger, and means for operating said twister mechanism after such projection of said needle.

10. The machine of claim 9 in which said needle engages said strand at two points differently spaced from said bight, and including means for reversing the relative positions of said points, while in engagement with said strand, before entry of said section in said twister mechanism.

11. The mechanism of claim 9 in which said needle comprises a shank and a bifurcated end, each furcation of said end engaging said wire strand during projecting movement of said needle, the points of engagement of said furcations being at opposite ends of said section entered in said twister mechanism, and means for reversing the positions of said furcations before entry of said section in said twister mechanism.

12. The mechanism of claim 11 including guide means supporting said needle shank, and cooperating cam means on said shank and on said guide means enforcing rotation of said needle through approximately 180° about the axis of said shank during transit thereof across said chamber.

13. The mechanism of claim 12 in which said cooperating means comprises a radial projection on said needle shank and a spiroidal trackway formed in said guide means, said projection being received in said trackway.

References Cited in the file of this patent
UNITED STATES PATENTS

| | | |
|---|---|---|
| 787,008 | Taylor | Apr. 11, 1905 |
| 1,241,548 | Peacock | Oct. 2, 1917 |
| 2,173,403 | Trimble | Sept. 19, 1939 |
| 2,277,394 | Everhart et al. | Mar. 24, 1942 |
| 2,355,644 | Haase | Aug. 15, 1944 |
| 2,512,754 | Tuft | June 27, 1950 |
| 2,528,538 | Nolt | Nov. 7, 1950 |
| 2,548,559 | Ronning et al. | Apr. 10, 1951 |